(12) United States Patent
Chen

(10) Patent No.: US 6,751,100 B2
(45) Date of Patent: Jun. 15, 2004

(54) COMPUTER ENCLOSURE WITH POWER SUPPLY BRACKET

(75) Inventor: Yun-Lung Chen, Tu-Chen (TW)

(73) Assignee: Hon Hsi Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/150,313

(22) Filed: May 16, 2002

(65) Prior Publication Data

US 2003/0193782 A1 Oct. 16, 2003

(30) Foreign Application Priority Data

Apr. 12, 2002 (TW) .......................................... 91204879

(51) Int. Cl.$^7$ ................................................ G06F 1/16
(52) U.S. Cl. ..................... 361/725; 361/683; 312/223.1; 312/223.2
(58) Field of Search ........................ 361/610, 683–686, 361/724–728, 801–803, 825; 312/223.1, 223.2, 293.2, 293.3, 321.5

(56) References Cited

U.S. PATENT DOCUMENTS

| | | | | |
|---|---|---|---|---|
| 5,777,848 A | * | 7/1998 | McAnally et al. | 361/725 |
| 5,973,918 A | * | 10/1999 | Felcman et al. | 361/683 |
| 5,995,364 A | * | 11/1999 | McAnally et al. | 361/685 |
| 6,272,009 B1 | * | 8/2001 | Buican et al. | 361/683 |
| 6,483,696 B1 | * | 11/2002 | Gan | 361/683 |
| 6,530,628 B1 | * | 3/2003 | Huang et al. | 312/223.2 |
| 6,580,603 B1 | * | 6/2003 | Resnick | 361/683 |

* cited by examiner

*Primary Examiner*—Darren Schuberg
*Assistant Examiner*—Anthony Q. Edwards
(74) *Attorney, Agent, or Firm*—Wei Te Chung

(57) ABSTRACT

A computer enclosure includes a body (10), and a bracket (40) for retaining a power supply (30). The body includes a rear panel, an opening (15) defined in the rear panel, a pair of opposing bent plates (16), and an engaging member (13). A supporting plate (17) is inwardly formed from each bent plate, and an L-shaped sliding slot (19) is defined in each first bent plate. The bracket includes a pair of pivots (48), a pair of cam plates (51), and a locking member (57). A smooth arcuate rim (52) extends perpendicularly inwardly from each cam plate. The pivots are movably received in the sliding slots. When the bracket is rotated about the pivots so that it can be locked within the body, the arcuate rims slide along the supporting plates of the body. The locking member then engages with the engaging member.

16 Claims, 7 Drawing Sheets

COMPUTER ENCLOSURE WITH POWER SUPPLY BRACKET

BACKGROUND OF THE INVENTION

1. Field of the Invention

The present invention relates to computer enclosures, and more particularly to computer enclosures having brackets for retaining power supplies.

2. Description of the Related Art

Taiwan Patent No. 253551 and Taiwan Application No. 88219428 disclose conventional systems wherein a power supply is firstly mounted to a bracket, and then the bracket is attached to a rear panel of a computer enclosure with screws. A screwdriver must be used to attach or detach such bracket to or from the enclosure. It is inconvenient and laborious to manipulate the screws. Furthermore, a typical computer enclosure with power supply is configured such that the power supply must first be removed to gain access to other components within the enclosure. Therefore, it is similarly inconvenient and laborious to have to unscrew and remove the power supply when maintenance or replacement of other components within the enclosure is required.

Taiwan Patent No. 317337 discloses another device for attaching a power supply in a computer. A bracket retaining a power supply therein is attached to a computer enclosure via a locking mechanism of the bracket. The device simplifies attachment and detachment procedures. However, the device still does not solve the problem of having to detach a power supply when maintenance or replacement of other components within the enclosure is required.

SUMMARY OF THE INVENTION

Accordingly, an object of the present invention is to provide a computer enclosure having a bracket for conveniently attaching or detaching a power supply to or from the enclosure.

Another object of the present invention is to provide a computer enclosure having a bracket that enables the power supply to be rotatably moved out from the enclosure.

To achieve the above objects, a computer enclosure in accordance with the present invention comprises a body, and a bracket for retaining a power supply. The body has a large drive case that extends rearwardly to form a connecting member. An engaging member is formed at a bottom wall of the connecting member. An opening is defined in a rear panel of the body. A pair of first bent plates is bent inwardly from the rear panel at top and bottom extremities of the opening respectively. A supporting plate is inwardly formed from a distal edge of each first bent plate. An L-shaped sliding slot is defined in a portion of each first bent plate that is distal from a side extremity of the body. A locking concave is defined in each first bent plate, in communication with the sliding slot. The bracket comprises a rear wall and a sidewall. A pair of second bent plates is bent perpendicularly from top and bottom portions of the rear wall respectively. A pivot is outwardly formed from each second bent plate. The two pivots are pivotably and slidably received in the sliding slots of the body, and can be locked in the locking concaves. A locking member extends from a top edge of the sidewall. A holder plate extends from a bottom edge of the sidewall, for supporting the power supply. A cam plate extends from the top edge of the sidewall, between the rear wall and the locking member. Another cam plate extends from the bottom edge of the sidewall, between the rear wall and the holder plate. A smooth arcuate rim extends perpendicularly inwardly from each cam plate. Each arcuate rim comprises a distal portion, and a proximal portion near the rear wall. When the bracket is rotated about the pivots so that it can be locked within the body, the arcuate rims slide along the supporting plates of the body between the proximal portions and the distal portions. The locking member then engages with the engaging member.

Other objects, advantages and novel features of the present invention will be drawn from the following detailed description of preferred embodiments of the present invention with the attached drawings, in which:

DESCRIPTION OF THE PREFERRED EMBODIMENTS

Figure 1:
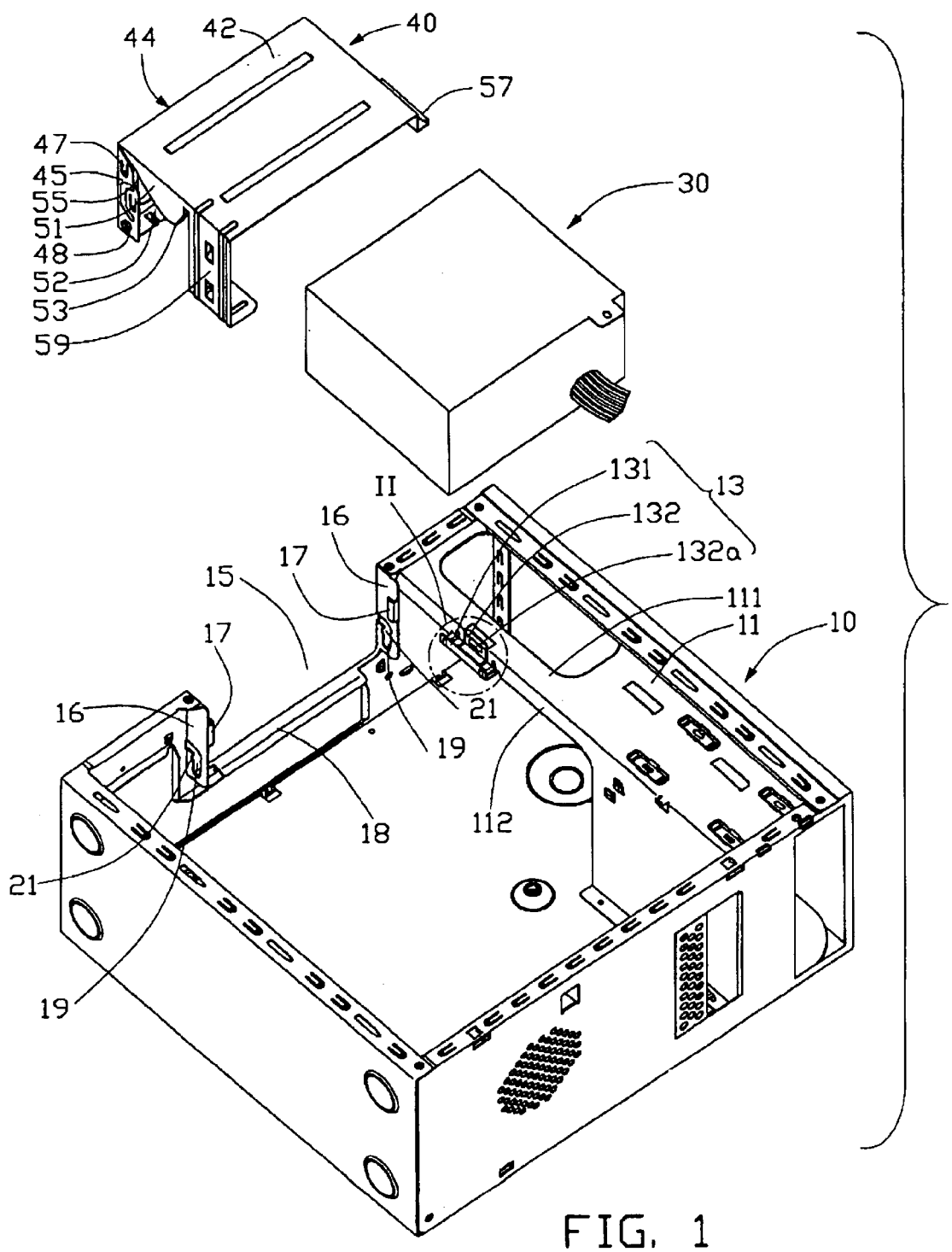
FIG. 1 is an exploded perspective view of a computer enclosure in accordance with a preferred embodiment of the present invention, showing a body of the computer enclosure resting on its side.
Figure 2:
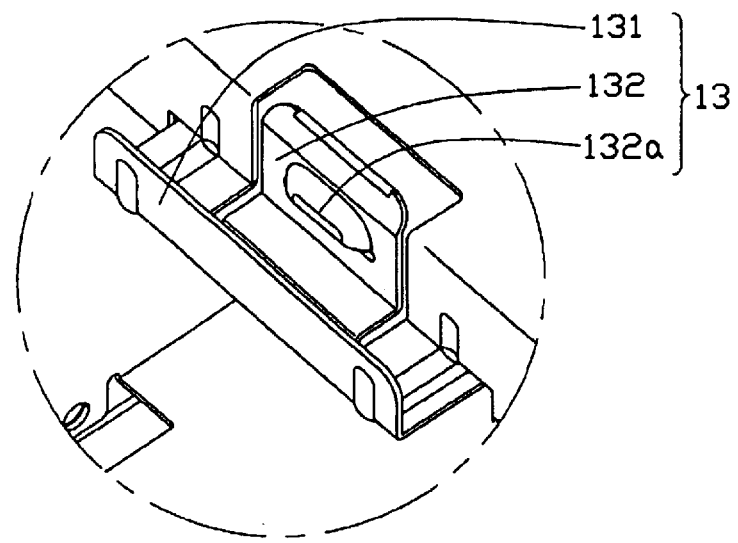
FIG. 2 is an enlarged view of a circled portion II of FIG. 1.

Referring to FIGS. 1 and 2, a computer enclosure in accordance with a preferred embodiment of the present invention comprises a body 10 and a bracket 40. The bracket 40 receives a power supply 30.

The body 10 has a large drive case 11 at an upper portion thereof, to accommodate a Compact Disc drive (not shown). A rear portion of the large drive case 11 extends rearwardly to form a generally L-shaped connecting member 111 that has a bottom wall 112. An engaging member 13 is formed at the bottom wall 112, and comprises a stopper plate 131 and an elastic plate 132. The stopper plate 131 has a generally L-shaped profile, and extends from an edge of the bottom wall 112. The elastic plate 132 also has a generally L-shaped profile, and extends from an elbow portion (not labeled) of the stopper plate 131. The elastic plate 132 comprises a protrusion 132a. The protrusion 132a protrudes from a portion of the elastic plate 132 that is coplanar with the bottom wall 112, and protrudes toward a portion of the stopper plate 131 that opposes the bottom wall 112. An opening 15 is defined in a rear panel (not labeled) of the body 10, to accommodate the combined bracket 40 and power supply 30. A pair of first bent plates 16 is bent inwardly from the rear panel at top and bottom extremities of the opening 15 respectively. A supporting plate 17 is inwardly formed from a distal edge of each first bent plate 16, near a side extremity of the body 10. The supporting plate 17 has a generally L-shaped profile. An L-shaped sliding slot 19 is defined in a portion of each first bent plate 16 that is distal from said side extremity of the body 10. Each sliding slot 19 terminates at a junction of the first bent plate 16 and the rear panel. A locking concave 21 is defined in each first bent plate 16, in communication with the sliding slot 19 near an elbow portion of the sliding slot 19. A bent flange 18 is bent inwardly from the panel at an extremity of the opening 15 that is between the second bent plates 16 and distal from said side extremity of the body 10.

Figure 3:
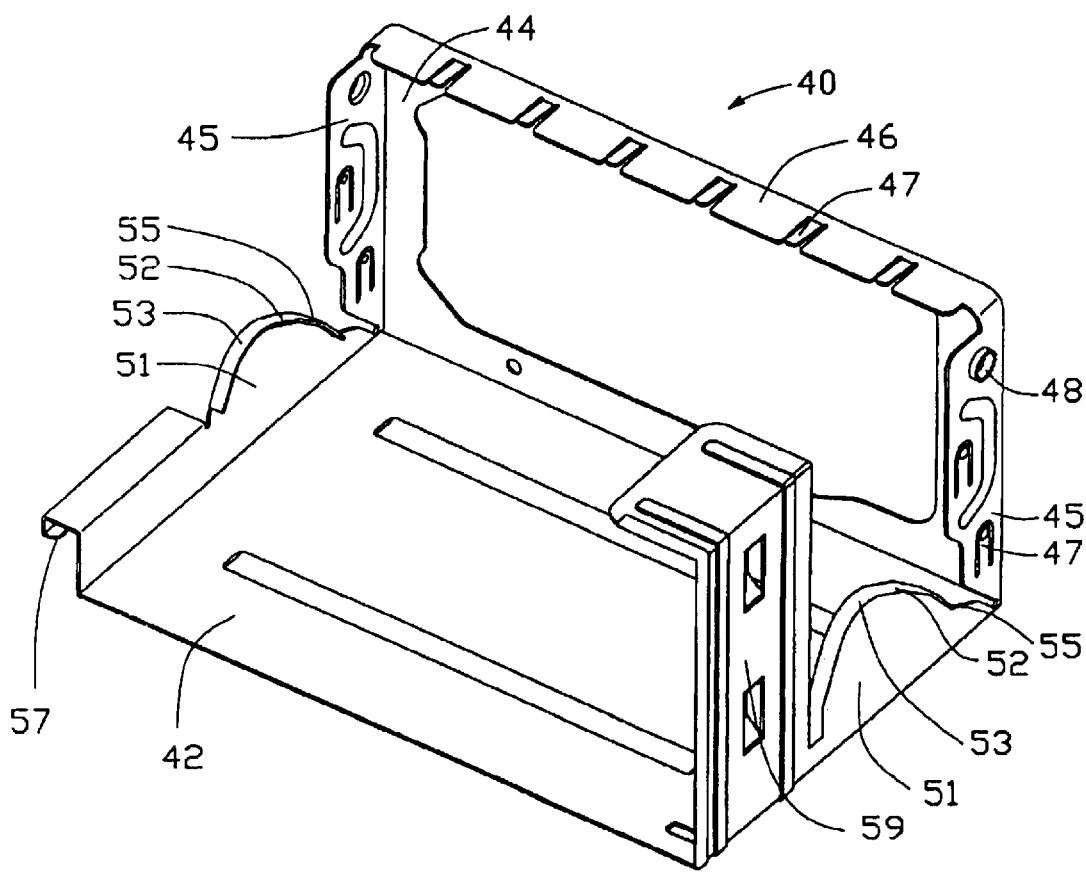
FIG. 3 is a perspective view of a bracket of the computer enclosure of FIG. 1, but viewed from another aspect.

Referring also to FIG. 3, the bracket 40 is pivotable about the body 10 at the opening 15. The bracket 40 comprises a sidewall 42 and a rear wall 44. A pair of second bent plates 45 is bent perpendicularly from top and bottom portions of the rear wall 44 respectively. An apron 46 is bent from a side portion of the rear wall 44 that is distal from the sidewall 42, and integrally connects the two second bent plates 45. A plurality of elastic fingers 47 is outwardly formed from the second bent plates 45 and apron 46. The elastic fingers 47 are for engaging the first bent plates 16 and the bent flange 18 of the body 10 to reduce Electro-Magnetic Interference (EMI). A pivot 48 is outwardly formed from each second bent plate 45. A locking member 57 extends from a top edge of the sidewall 42, for engaging with engaging member 13 of the body 10. A generally L-shaped holder plate 59 extends from a bottom edge of the sidewall 42, to support the power supply 30. A cam plate 51 extends from the top edge of the sidewall 42, between the rear wall 44 and the locking member 57. Another cam plate 51 extends from the bottom edge of the sidewall 42, between the rear wall 44 and the holder plate 59. An arcuate rim 52 extends perpendicularly inwardly from a free edge of each cam plate 51. Each arcuate rim 52 comprises a distal portion 53, and a proximal portion 55 near the rear wall 44. The arcuate rim 52 is for sliding along the supporting plate 17 of the body 10 between the distal portion 53 and the proximal portion 55.

Figure 4:
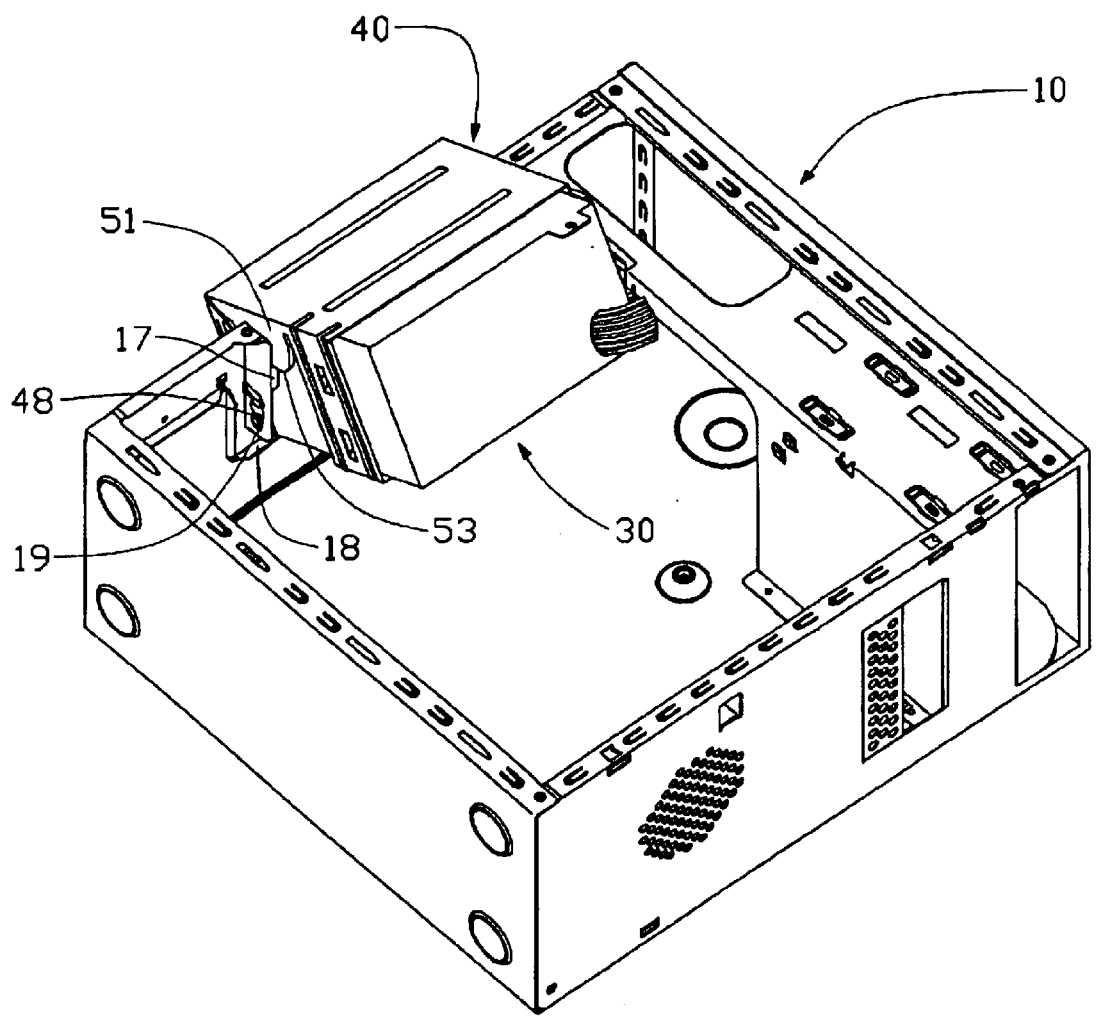
FIG. 4 is an assembled view of FIG. 1, showing the bracket being rotated into the body.
Figure 5:
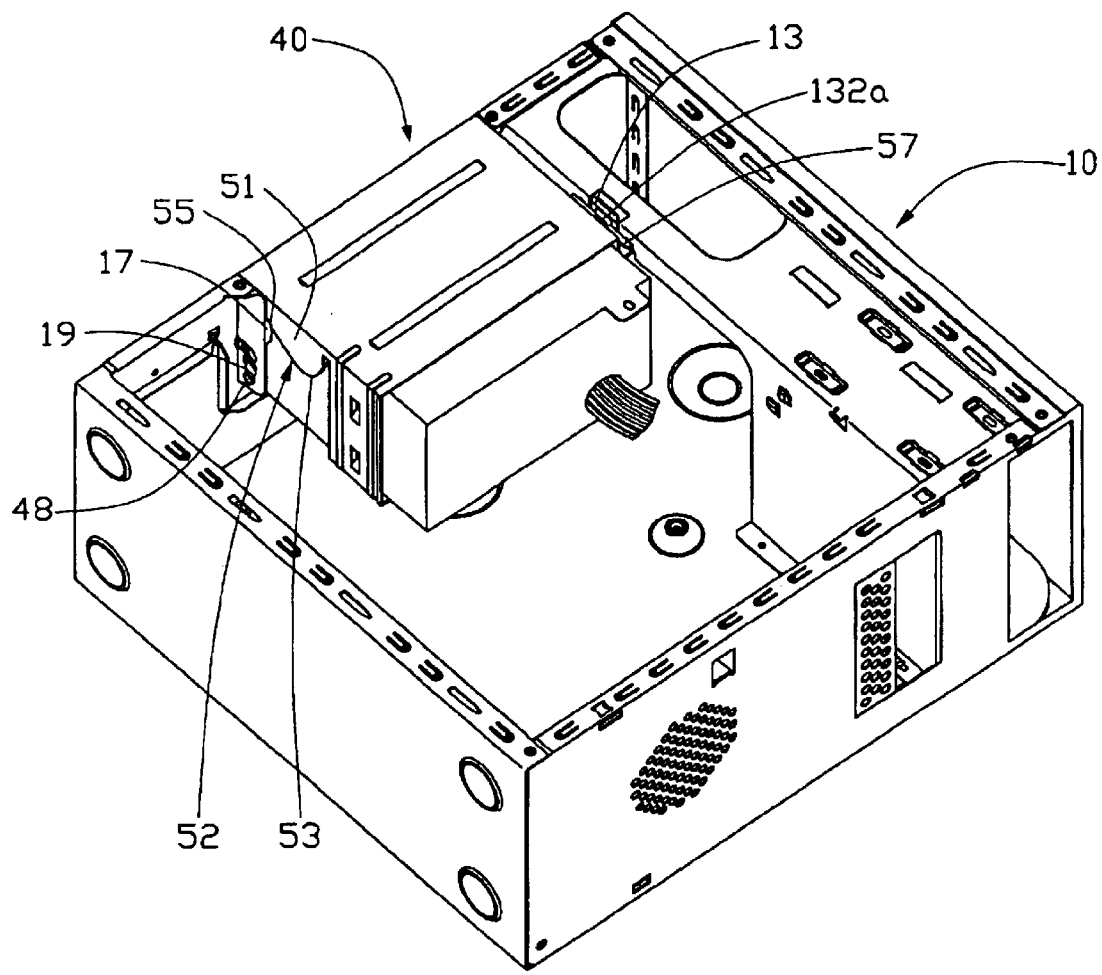
FIG. 5 is similar to FIG. 4, but showing the bracket fully rotated to be locked within the body.

Referring particularly to FIGS. 1, 4 and 5, in assembly of the computer enclosure, the power supply 30 is firstly installed into the bracket 40. The power supply 30 is pushed through the holder plate 59 of the bracket 40 until it contacts the rear wall 44. In this position, the second bent plates 45 and apron 46 cooperatively accommodate one end of the power supply 30, and the holder plate 59 supports an opposite end of the power supply 30. Thus, the power supply 30 is securely installed in the bracket 40. Then the bracket 40 is attached to the body 10. The pivots 48 of the bracket 40 are slid into inmost extremities of the sliding slots 19 of the body 10. Then, the bracket 40 is rotated so that it can be locked within the body 10. The supporting plates 17 of the body 10 first contact the distal portions 53 of the cam plates 51 of the bracket 40. The distal portions 53 cause the pivots 48 to move predetermined distances along the sliding slots 19, thereby preventing the bent flange 18 from interfering with a junction (not labeled) of the rear wall 44 and apron 46. The arcuate rims 52 of cam plates 51 proceed to slide along the supporting plates 17 from the distal portions 53 to the proximal portions 55, and the pivots 48 slide back to the inmost extremities of the sliding slots 19. The engaging member 13 of the body 10 can then engage the locking member 57 of the bracket 40. The stopper plate 131 of the engaging member 13 receives the locking member 57, and the protrusion 132*a* of the elastic plate 132 snappingly engages the locking member 57. The elastic fingers 47 of the bracket 40 elastically press the first bent plates 16 and bent flange 18 to reduce EMI. Locking of the bracket 40 to the body 10 is thus completed.

Figure 6:
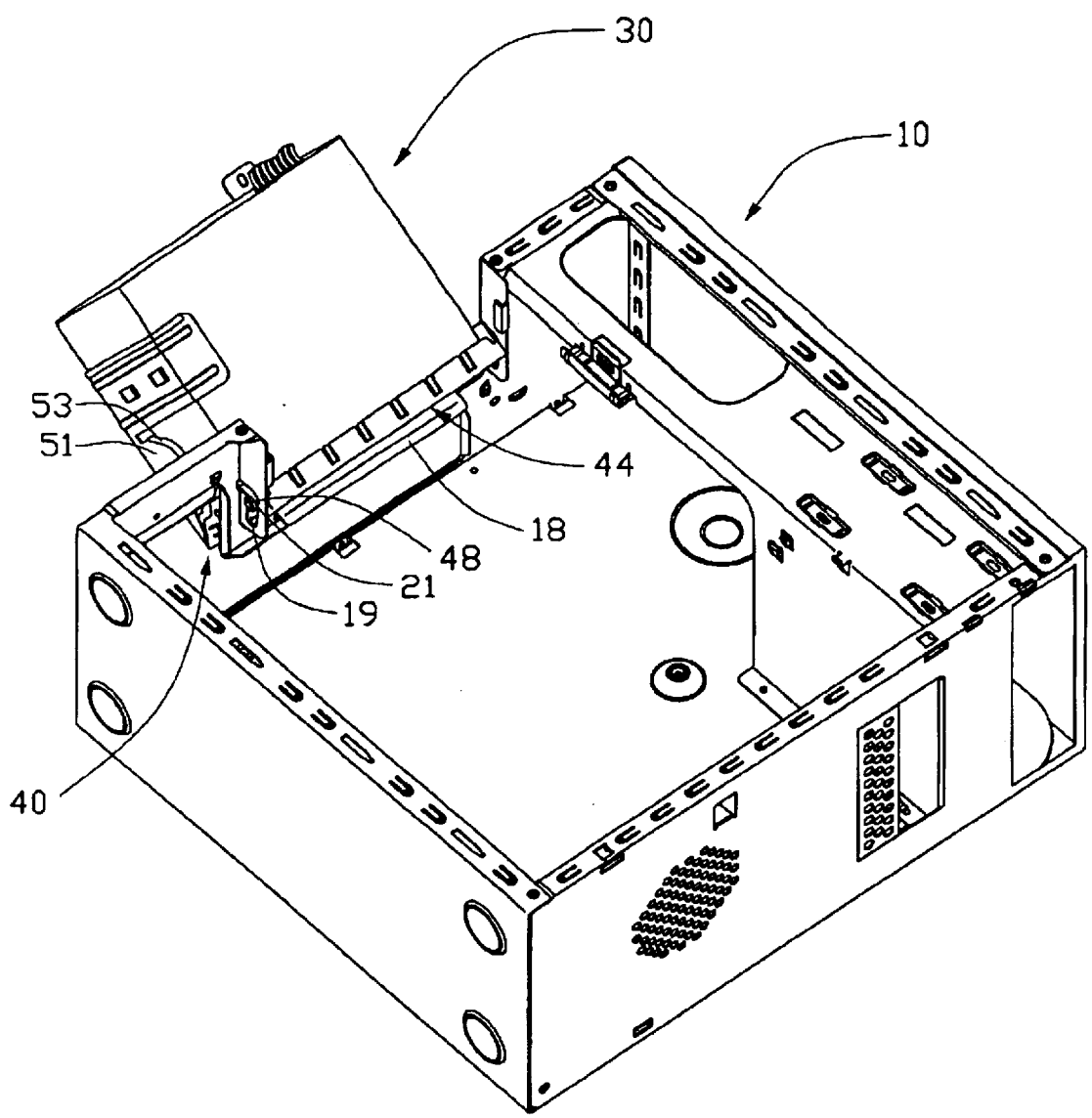
FIG. 6 is similar to FIGS. 4 and 5, but showing the bracket rotated out from the body.

Referring to FIG. 6, when maintaining the power supply 30 or other components (not shown) inside the body 10, a user can easily unlock the locking member 57 from the engaging member 13 and rotate the bracket 40 out of the body 10. When rotating the bracket 40, the arcuate rims 52 of cam plates 51 of the bracket 40 slide along the supporting plates 17 of the body 10 from the proximal portions 55 to the distal portions 53. The distal portions 53 cause the pivots 48 to move the predetermined distances along the sliding slots 19, thereby preventing the bent flange 18 from interfering with the junction (not labeled) of the rear wall 44 and apron 46. After the bracket 40 is rotated out of the body 10, the rear wall 44 of the bracket 40 rests against an outmost portion of the bent flange 18, and the pivots 48 of the bracket 40 lock in the locking concaves 21 to prevent the pivots 48 from sliding out of the sliding slots 19. Thus, the power supply 30 inside the bracket 40 is suspended outside the body 10. The user then has ample room to maintain other components (not shown) inside the body 10. If the user wants to detach the bracket 40, he or she simply unlocks the pivots 48 from the locking concaves 21, and slides the pivots 48 out from the sliding slots 19.

According to the computer enclosure of the preferred embodiment, a distance between each pivot 48 and the distal portion 53 of the arcuate rim 52 of the cam plate 51 is greater than a distance between the pivot 48 and the proximal portion 55. Therefore, when the corresponding supporting plates 17 engage the distal portions 53, the bracket 40 is at a more distal location relative to the body 10 and does not interfere with the bent flange 18. On the contrary, when the supporting plates 17 engage the proximal portions 55, the bracket 40 is at a more proximal location relative to the body 10 and can be accommodated in the opening 15 of the computer enclosure 10. Furthermore, each arcuate rim 52 has a smooth surface, allowing easy and convenient rotation of the bracket 40.

Figure 7:
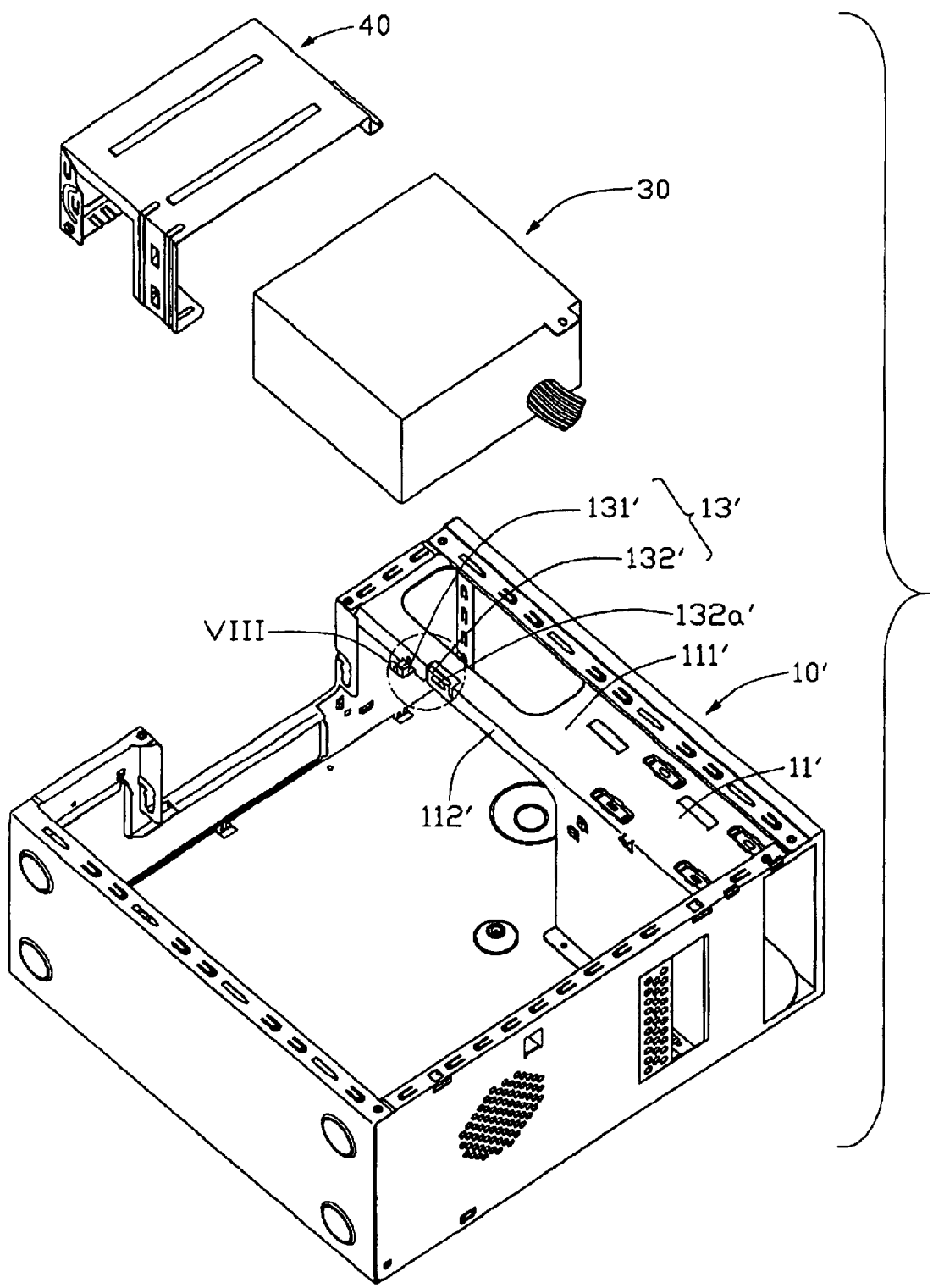
FIG. 7 is an exploded perspective view of a computer enclosure in accordance with an alternative embodiment of the present invention, showing a body of the computer enclosure resting on its side.
Figure 8:
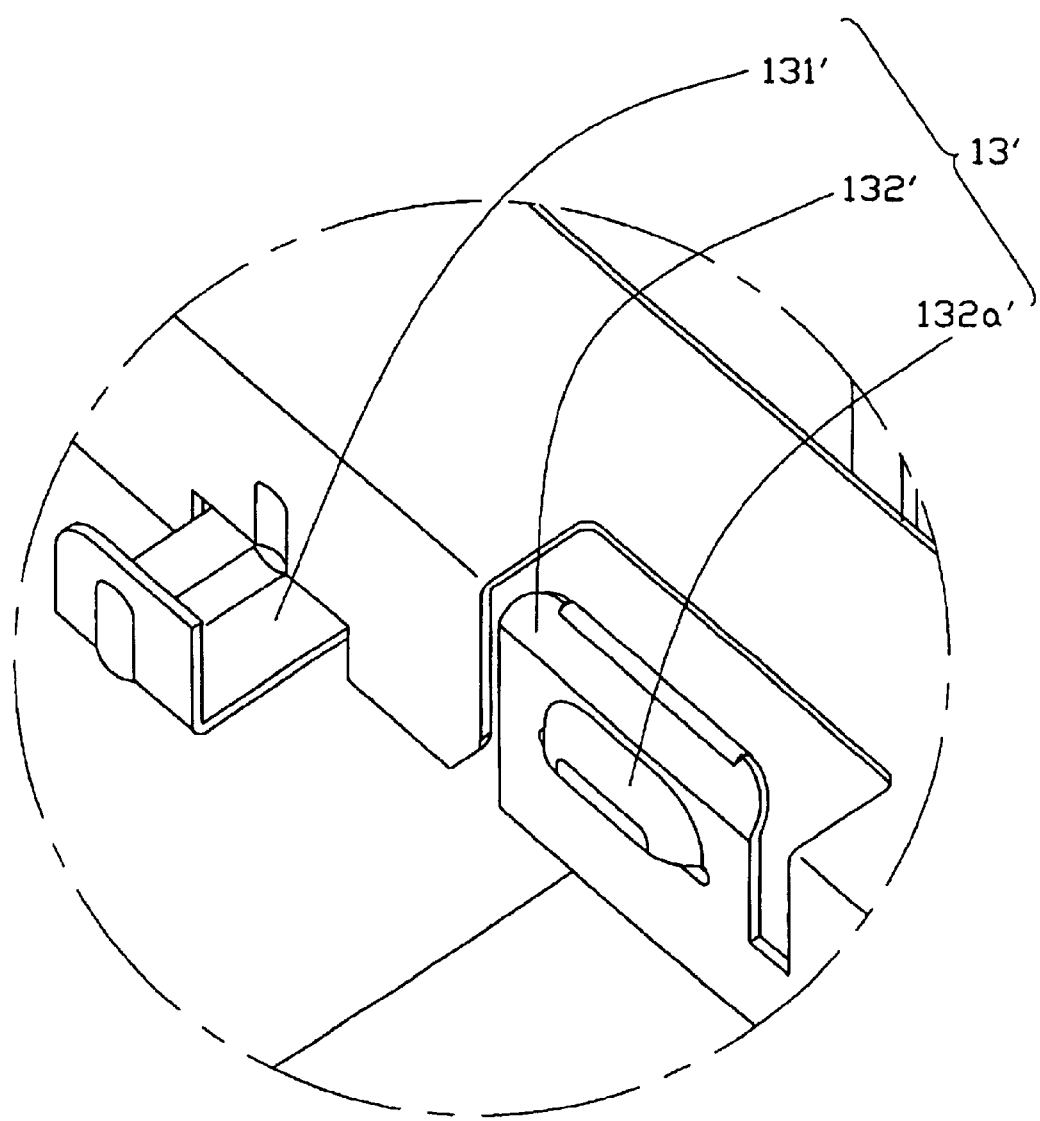
FIG. 8 is an enlarged view of a circled portion VIII of FIG. 7.

FIGS. 7 and 8 show a computer enclosure in accordance with an alternative embodiment of the present invention. A body 10' has a large drive case 11' at an upper portion thereof, to accommodate a Compact Disc drive (not shown). A rear portion of the large drive case 11' extends rearwardly to form a generally L-shaped connecting member 111' that has a bottom wall 112'. An engaging member 13' is formed at the bottom wall 112', and comprises a stopper plate 131' and an elastic plate 132'. The stopper plate 131' has a generally L-shaped profile, and extends from an edge of the bottom wall 112'. The elastic plate 132' is stamped from and integrally joined with the connecting member 111', and is disposed forwardly of and near the stopper plate 131'. A protrusion 132*a*' protrudes downwardly from the elastic plate 132'.

While the present invention has been illustrated by the description of the embodiments thereof, and while the embodiments have been described in considerable detail, it is not intended to restrict or in any way limit the scope of the appended claims to such detail. Additional advantages and modifications will readily appear to those skilled in the art. Therefore, the present invention is not limited to the specific details and illustrative examples shown and described.

What is claimed is:

1. An enclosure, comprising:
   a body comprising a panel and an engaging member, the panel defining an opening; and
   a bracket pivotably attached to the body at the panel, the bracket being adapted for removably receiving a power supply therein, the bracket comprising a locking member detachably engagable with the engaging member of the body to thereby fix the bracket to the body;
   wherein a pair of bent plates is formed from said panel at opposite extremities of said opening, and a substantially L-shaped sliding slot is defined in each of said first bent plates.

2. The enclosure as claimed in claim 1, wherein a supporting plate is inwardly formed from a distal edge of each said first bent plate.

3. The enclosure as claimed in claim 1, wherein said sliding slot comprises a locking portion.

4. The enclosure as claimed in claim 3, wherein said bracket comprises a rear wall and a sidewall.

5. The enclosure as claimed in claim 4, wherein a pair of second bent plates is bent substantially perpendicularly from opposite portions of said rear wall.

6. The enclosure as claimed in claim 5, wherein a pivot is formed at each of said second bent plates, for the pivot being movably received in a corresponding sliding slot and being locked with said locking portion.

7. The enclosure as claimed in claim 4, wherein a holder is arranged at said sidewall of said bracket for supporting said power supply.

8. The enclosure as claimed in claim 4, wherein two cam plates are respectively arranged at opposite portions of said sidewall of said bracket.

9. The enclosure as claimed in claim 8, wherein an arcuate rim extends substantially perpendicularly from a free edge of each of said cam plates, and said arcuate rim has a distal portion and a proximal portion.

10. The enclosure as claimed in claim 9, wherein said arcuate rim slides along a corresponding supporting plate of said body between said distal portion and said proximal portion when said bracket is pivoted relative to said body.

11. The enclosure as claimed in claim 1, wherein said engaging member, which is formed at a bottom wall of the body, comprises a stopper plate and an elastic plate.

12. The enclosure as claimed in claim 11, wherein said stopper plate is substantially L-shaped.

13. The enclosure as claimed in claim 11, wherein said elastic plate is connected with said stopper plate.

14. The enclosure as claimed in claim 11, wherein said elastic plate is spaced from and near said stopper plate.

15. The enclosure as claimed in claim 11, wherein a protrusion protrudes from said elastic plate.

16. A bracket for use with a power supply within an enclosure of a computer, comprising:
   a side wall;
   a rear wall extending from said side wall along an edge of said rear wall;
   an opening in said rear wall;
   an apron and bent plates extending from edges of said rear wall other than said edge thereof;
   a holding plate for use with the power supply, extending from one side of the side wall and defining an L-shaped configuration with a free end extending toward one direction; and
   a locking member for use with the enclosure, extending from another side of the side wall opposite to said side; wherein
   said locking member generally extends toward said direction.

* * * * *